United States Patent [19]

Akutsu

[11] Patent Number: 4,995,924

[45] Date of Patent: Feb. 26, 1991

[54] SYNCHRONIZER RING IN SPEED VARIATOR MADE OF COPPER-BASE ALLOY

[75] Inventor: Hidetoshi Akutsu, Kitamoto, Japan

[73] Assignee: Mitsubishi Metal Corporation, Tokyo, Japan

[21] Appl. No.: 416,867

[22] Filed: Oct. 4, 1989

Related U.S. Application Data

[63] Continuation of Ser. No. 170,911, Mar. 21, 1988.

[30] Foreign Application Priority Data

| Mar. 24, 1987 | [JP] | Japan | 62-69879 |
| Mar. 24, 1987 | [JP] | Japan | 62-69880 |
| Mar. 24, 1987 | [JP] | Japan | 62-69881 |
| Mar. 24, 1987 | [JP] | Japan | 62-69882 |
| Mar. 25, 1987 | [JP] | Japan | 62-70757 |
| Mar. 25, 1987 | [JP] | Japan | 62-70758 |
| Mar. 25, 1987 | [JP] | Japan | 62-70759 |
| Mar. 26, 1987 | [JP] | Japan | 62-72258 |

[51] Int. Cl.⁵ ............................................. C22C 9/04
[52] U.S. Cl. .................................... 148/433; 148/434; 420/471; 420/478; 420/479; 420/480; 428/472.2
[58] Field of Search ............... 420/470, 471, 478, 479, 420/480; 148/433, 434; 428/469, 472.2

[56] References Cited

U.S. PATENT DOCUMENTS

| 3,703,367 | 11/1972 | Cocks | 420/479 |
| 3,773,504 | 11/1973 | Niimi et al. | 420/480 |
| 4,472,213 | 9/1984 | Tabei et al. | 420/478 |
| 4,750,953 | 6/1988 | Tabei | 420/479 |
| 4,851,191 | 7/1989 | Lee et al. | 420/471 |

FOREIGN PATENT DOCUMENTS

| 3122522 A1 | 12/1982 | Fed. Rep. of Germany . | |
| 28789 | 11/1969 | Japan | 420/480 |
| 29642 | 3/1981 | Japan | 420/480 |
| 81650 | 7/1981 | Japan | 420/479 |
| 127741 | 10/1981 | Japan | 420/471 |
| 25939 | 2/1984 | Japan | 420/479 |
| 53645 | 3/1984 | Japan | 420/479 |
| 116347 | 7/1984 | Japan | 420/478 |
| 116348 | 7/1984 | Japan | 420/479 |
| 117342 | 10/1984 | Japan | 420/478 |
| 86236 | 5/1985 | Japan | 420/471 |
| 86237 | 5/1985 | Japan | 420/471 |
| 114545 | 6/1985 | Japan | 420/471 |
| 149740 | 8/1985 | Japan | 420/471 |
| 174843 | 9/1985 | Japan | 420/480 |
| 34154 | 2/1986 | Japan | 420/479 |
| 250138 | 10/1987 | Japan . | |

OTHER PUBLICATIONS

Karl-Heinz Matucha et al., Verbesserte Werkstoffe fur Synchronringe, ATZ Automobiltechnische Zeitschrift 83 (1981)5, pp. 227-230.
Dr.-Ing. Herwig Nielsen et al.-Aluminum—Taschenbuch Aluminium—Verlag GmbH—Dusseldorf-19-74-p. 670.
Kupfer-Zink-Legierungen-DIN 17660-Apr. 1974, "Wrought Copper Alloys; Copper-Zinc Alloys (Brass), (Special Brass), Chemical Composition".

Primary Examiner—Theodore Morris
Assistant Examiner—George Wyszomierski
Attorney, Agent, or Firm—Frishauf, Holtz, Goodman & Woodward

[57] ABSTRACT

A novel synchronizer ring for use in a speed variator that is made of a Cu base alloy and which exhibits good initial accommodation by mating surfaces while ensuring high wear resistance is disclosed. The ring is made of a Cu base alloy containing 20-40% Zn (all percents being on a weight basis), 2-8% Al, and at least two components (intermetallic compound forming components) selected from among the following five elements, i.e., 0.1-3% of at least one of Ti, Zr and Cr, 0.1-3% Sn, 0.1-6% of at least one of Fe, Ni and Co, 0.1-5% Mn and 0.2-2% Si, and optionally at least one additional component that differs from said selected two components and which is selected from among 0-5% Mn, 0-3% Sn and 0-3% of at least one of Ti, Zr and Cr, and the balance being Cu and incidental impurities. The ring also has either an oxide film layer of aluminum oxide base with an average thickness of 0.1-10 μm or a work-hardened layer with an average thickness of 5-300 μm formed on the surface of the ring where it is to contact a mating member.

17 Claims, 1 Drawing Sheet

SYNCHRONIZER RING IN SPEED VARIATOR MADE OF COPPER-BASE ALLOY

This application is a continuation application of Ser. No. 07/170,911 filed Mar. 21, 1988.

FIELD OF THE INVENTION

The present invention relates to a synchronizer ring of a Cu base alloy for use in speed variators that has not only good initial compatibility to mating surfaces but also high wear resistance.

BACKGROUND OF THE INVENTION

A perspective view, of a typical synchronizer ring for use in a speed variator is shown in FIG. 1. The inner surface 1 if the ring is subjected to intermittent surface contact with a rotating tapered cone under high pressure and the outer circumference of the ring is provided with key grooves 3 that are to come into engagement with keys. The outer edge of the ring circumference is provided with spaced chamfers 2 that mesh with chamfers on mating hub sleeve. In order for the synchronizer ring to exhibit its function, it must have high strength, high wear resistance and good compatibility with the mating members. Synchronizer rings have, therefore, been commonly fabricated of high strength brass which possesses these characteristics. "Pin" type synchronizer rings are also available that have a threaded portion on the outer circumference which comes into engagement with the mating tapered cone.

The demand for increasing the power output of speed variators is constantly growing and the prior art synchronizer rings made of high strength brass receive the high surface pressure exerted by either one of the mating members (i.e., tapered cone, keys, and chamfers on a hub sleeve). Because of the resulting decrease in the initial compatibility of the ring, it has frequently experienced one or more type of abnormal wear including bright surface wear and adhesive wear, and its useful life is inevitably shortened.

The present inventor has, therefore, conducted studies in order to develop a synchronizer ring for speed variators that is free from the aforementioned problems of the prior art version made of high-strength brass. As a result, the present inventor has found that this objective can be attained by the following synchronizer ring:

A synchronizer ring made of a Cu-base alloy that contains 20-40% Zn (all percents being on a weight basis), 2-8% al, and at least two components (intermetallic compound forming components) selected from among the following five elements, 0.1-3% of at least one of Ti, Zr and Cr, 0.1-3% Sn, 0.1-6% of at least one of Fe, Ni and Co., 0.1-5% Mn and 0.2-2% Si, and optionally at least one additional component that differs from said selected two components and which is selected from among 0-5% Mn, 0-3% Sn and 0-3% of at least one of Ti, Zr and Cr, and the balance being Cu and incidental impurities, said ring having either an oxide film layer of aluminum oxide ($Al_2O_3$) base with an average thickness of 0.1-10 μm or a work-hardened (e.g., shot-blasted or cold pressed) layer with an average thickness of 5-300 μm formed in a selected area of the surface that is to have contact with at least one of the following mating members, a tapered cone, keys, or chamfers or a hub sleeve.

This synchronizer ring exhibits good initial compatibility with mating surfaces even under the high surface pressure exerted during high-output operations of a speed variator and as a result, only a minimum amount of abnormal wear will occur in the initial period of the use of the ring.

The present inventor has also filed copending application Ser. No. 97/157,634 directed to synchronizer rings for use in speed variators produced from copper base alloys.

SUMMARY OF THE INVENTION

The present invention has been accomplished on the basis of the above finding. The principal object of the present invention is to provide synchronizer ring of a Cu base alloy for use in a speed variator that has good initial compatibility at the surface where is contacts mating members and which also exhibits high wear resistance.

This object of the present invention can be attained by a synchronizer ring made of a Cu-base alloy that contains 20-40% Zn (all percents being on a weight basis), 2-8% Al, and at least two components (intermetallic compound forming components) selected from among the following five elements, i.e., 0.1-3% of at least one of Ti, Zr and Cr, 0.1-3% Sn, 0.1-6% of at least one of Fe, Ni and Co, 0.1-5% Mn and 0.2-2% Si, and optionally at least one additional component that differs from said selected two components and which is selected from among 0-5% Mn, 0-3% Sn and 0-3% of at least one of Ti, Zr and Cr, and the balance being Cu and incidental impurities, said ring having either an oxide film layer of aluminum oxide base with an average thickness of 0.1-10 μm or a work-hardened layer with an average thickness of 5-300 μ formed on the surface of the ring where it is to contact a mating member.

DETAILED DESCRIPTION OF THE INVENTION

Figure 1:
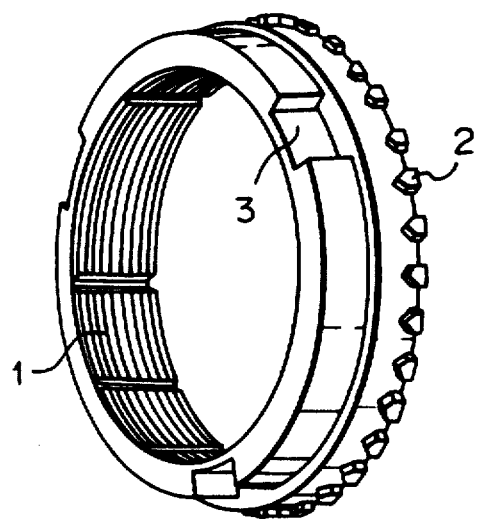
FIG. 1 is a perspective view of a typical synchronizer ring for use in a speed variator.

The criticality of the composition of the Cu base alloy of which the synchronizer ring of the present invention is made and that of the average thickness of the oxide or work-hardened layer are described hereinafter.

(a) Zn and Al

These elements determine the structure of the alloy of the matrix. They improve the wear resistance of the matrix and impart the necessary strength and toughness to synchronizer ring. These elements are essential for the purpose of forming an oxide film layer of $Al_2O_3$ base (e.g. $Al_2O_3$-$ZnO_3$ or $Al_2O_3$-$ZnO_3$-CuO) on the ring surface that exhibits good initial compatibility with mating surfaces and which serves to prevent the bright surface wear due to friction between metals or the seizure due to adhesion to mating surfaces, or a work-hardened layer which displays improved fatigue strength and yield strength while preventing the adhesion (or seizure) due to plastic flow resulting from excessive local heating, thereby preventing initial abnormal wear and improving initial compatibility with mating surfaces. If the contents of Zn and Al are less than 20% and 2%, respectively, the desired characteristics or oxide film layer or work-hardened layer cannot be attained. If the contents of Zn and Al exceed 40% and 8% ,respectively, toughness will decrease. Therefore, the contents of Zn and Al are respectively limited to be within the ranges of 20-40% and 2-8%.

(b) Intermetallic compound forming components (i) Ti/Zr/Cr and Sn

An element selected from among Ti, Zr and Cr, as well as Sn, when combined together, serve as refiners of crystal grains. These elements are also effective in improving the strength, toughness and wear resistance of the alloy, as well as the wear resistance of the oxide film layer or work-hardened layer by forming intermetallic compounds finely dispersed in the matrix. If the content of an element selected from among Ti, Zr and Cr, or Sn is less than 0.1%, the intended effects are not attainable. If the content of an element selected from among Ti, Zr and Cr or Sn exceeds 3%, the toughness of the alloy will be decreased. Therefore, the content of an element selected from among Ti, Zr and Cr is limited to be within the range of 0.1-3% whereas the content of Sn is limited to be within the range of 0.1-3%.

(ii) Ti/Zr/Cr and Fe/Ni/Co

These elements form intermetallic compounds that are finely dispersed in the matrix of the alloy and which are effective in providing improved wear resistance without sacrificing the strength and toughness required of the synchronizer ring. If the content of an element selected from among Ti, Zr and Cr or an element selected from among Fe, Ni and Co is less than 0.1%, the desired effects are not attainable. If the contents of elements of the two groups exceed 3% and 6%, respectively, the amounts of the intermetallic compounds formed are too large to avoid deterioration of cutting property. Therefore, the content of an element selected from among Ti, Zr and Cr is limited to be within the range of 0.1-3% whereas the content of an element selected from among Fe, Ni and Co is limited to be within the range of 0.1-6%.

(iii) Si and Mn

These elements, when combined together, form an intermetallic compound that is finely dispersed in the matrix of the alloy and which is effective in improving not only the strength and toughness of the synchronizer ring but also its wear resistance. These elements are also dispersed in the oxide film layer or work-hardened layer so as to improve the anti-seizure property of the oxide film layer or to provide the work-hardened layer with improved compatibility with mating surfaces and improved anti-seizure property as well. If the contents of Si and Mn are less than 0.2% and 0.1%, respectively, the desired effects are not attainable. If the contents of Si and Mn exceed 2% and 5%, respectively, excessive slag formation tends to occur during melting operations. Therefore, the contents of Si and Mn are limited to be within the ranges of 0.2-2% and 0.1-5%, respectively.

(iv) Fe/Ni/Co and Si

These elements form intermetallic compounds that are finely dispersed in the matrix of the alloy and which are effective in improving the strength and wear resistance of the synchronizer ring. The intermetallic compounds are also dispersed in the oxide film layer or work-hardened layer to improve the resistance of these layers against seizure. If the contents of Si and an element selected from among Fe, Ni and Co are less than 0.2% and 0.1%, respectively, the desired effects are not attainable. If the content of Si exceeds 2%, excessive slag formation tends to occur during melting operations. If the content of an element selected from among Fe, Ni and Co exceeds 6%, the toughness of the alloy will be decreased. Therefore, the contents of Si and an element selected from among Fe, Ni and Co are limited to be within the ranges of 0.2-2% and 0.1-6%, respectively.

(c) Additional component

One or more components selected from the group consisting of following (i) to (iii) can be further added to the synchronizer ring alloy in so far as the additional component or components do not constitute a duplicate addition with the foregoing intermetallic compound forming components. Thus, if Ti and Zr are present as one of said intermetallic compound forming components, an additional component or additional components could only be selected from Mn and Sn.

(i) Mn

Manganese will dissolve in the matrix to enhance its strength. It also has the ability to form fine spherical particles of an intermetallic compound to provide improved wear resistance. Manganese is optionally used but if its content is less than 0.1%, the desired effects are not attainable. Even if the Mn content exceeds 5%, no further improvements are attainable and instead, excessive slag formation tends to occur during melting operations. Therefore, the content of Mn, if it is used at all, is preferably limited to be within the range of 0.1-5%.

(ii) Sn

Tin is particularly effective in preventing adhesive wear, thereby ensuring superior anti-seizure property. This element is optionally used but if its content is less than 0.1%, the desired effects are not attainable. If the content on Sn exceeds 3%, the hot workability of the alloy is impaired. Therefore, the content of Sn is preferably limited to be within the range of 0.1-3%.

(III) Ti/Zr/Cr

These elements refine the alloy's structure and enhance the strength of grain boundaries so as to provide improved wear resistance. Furthermore, these elements combine with Fe, Ni, Co or Sn to form fine intermetallic compounds, thereby achieving further improvements in the wear resistance and anti-seizure property of surface coatings, notably the work-hardened layer. These elements are optionally contained but if their content is less than 0.05%, the desired effects are not attainable. If the content of an element selected from among Ti, Zr and Cr exceeds 1.5%, the melt will not flow smoothly during casting operations. Therefore, the content of an element selected from among Ti, Zr and Cr is preferably limited to be within the range of 0.05-1.5%.

The alloy of which the synchronizer ring of the present invention is made sometimes contains incidental impurities such as P, Pb and even Mg. If their total content is not more than 1%, these incidental impurities will cause no adverse effects on the characteristics of the alloy. Therefore, the incidental impurities present in a total amount not exceeding 1% is tolerated for the purposes of the present invention.

(d) Oxide film layer

The oxide film layer microscopically contains a number of small pores which serve as oil reservoirs to provide the ring with improved initial compatibility for mating surfaces in practical applications. The ring in synchronization with mating surfaces is intensely heated on account of frictional contact with the latter but the oxide film layer which has low thermal conductivity effectively retards the elevation of temperature in the interior of the ring. The oxide film layer also ensures the progress of normal wear without causing abnormal types of wear such as bright surface wear and adhesive wear. If the average thickness of the oxide film layer is less than 0.1 μm, the desired effects are not attainable. If the average thickness of the oxide film layer exceeds 10 μm, chipping or spalling is prone to occur. Therefore, the average thickness of the oxide film layer is limited to be within the range of 0.1–10 μm.

(e) Work-hardened layer

The work-hardened layer can be formed by shot blasting or sand blasting. If this layer is to be provided only on the surface of the synchronizer ring which is to be abraded by mating tapered cone, it may be formed by cold pressing the alloy with a steel die. The so produced work-hardened layer has sufficiently improved fatigue strength and yield strength to exhibit high resistance to plastic flow under local heating. Since this retards seizure, the occurrence of initial abnormal wear is effectively prevented to ensure good compatibility of synchronizer ring with mating surfaces in the initial stage of application. If the average thickness of the work-hardened layer is less than 5 μm, the desired effects are not attainable. If the average thickness of the work-hardened layer exceeds 300 μm, the desired effects are also unattainable. Therefore, the average thickness of the work-hardened layer is limited to be within the range of 5–300 μm.

The following examples are provided for the purpose of further illustrating the present invention but are in no way to be taken as limiting.

EXAMPLE 1

Using an ordinary high-frequency induction furnace, melts of Cu base alloys having the compositions shown in Table 1 were prepared and molded into billets having a diameter of 200 mm and a length of 400 mm. The billets were extruded into round bars (60 mmφ) with a press. Each round bar was cut into sections having a predetermined length, which were hot forged at temperatures in the range of 600°–750° C., subjected to cutting and grinding treatments, and subsequently heated in the atmosphere at temperatures in the range of 100°–350° C. for predetermined periods in the range of from 15 minutes to 6 hours so as to form oxide film layers (for their average thicknesses, see Table 1) on the entire surface of the sections. By these procedures, sample Nos. 1–14 of the synchronizer ring of the present invention and comparative sample Nos. 1–10 were fabricated; each ring sample had an inside diameter of 58 mm and a thickness of 4 mm, with 36 chamfers provided around the peripheral edge of the ring.

Comparative sample Nos. 1–10 were outside the scope of the present invention in terms of either the content of one or more constituent elements or the average thickness of the oxide film layer (as marked with asterisks in Table 1).

The respective samples of synchronizer ring were subjected to a synchronizing endurance test under the following conditions;

Rotational speed of tapered cone: 1,000 rpm
Axial force exerted on the tapered cone: 50 kg
Oil: mission oil No. 80
Oil temperature: 70° C.
Tapered cone movement: 20,000 cycles at synchronization intervals of 0.25–0.3 sec.

The parameters that were measured or examined in this test were: axial travel from the normal synchronizing position (indicative of wear): occurrence of adhesive wear; and friction coefficients in the initial stage (up to 500 cycles) and in the later stage (stable period).

In order to examine the cracking and deformation that might occur in the ring, the samples were also subjected to the second kind of synchronizing endurance test under the following conditions:

Rotational speed of tapered cone: 2,000 rpm
Axial force exerted on the tapered cone: 90 kg
Oil: mission oil No. 80
Oil temperature: 70° C.
Tapered cone movement: 5,000 cycles at synchronization intervals of 0.25–0.3 sec The test results are shown in Table 1.

TABLE 1

| Samples | | Composition (wt %) | | | | | | Cu + impurities | Average thickness of oxide film layer (μm) | Axial travel by wear (mm) | Adhesive wear | Friction coefficient | | Cracking or deformation |
|---|---|---|---|---|---|---|---|---|---|---|---|---|---|---|
| | | Zn | Al | Ti | Zr | Sn | Mn | | | | | Initial | Later | |
| Synchro- | 1 | 20.6 | 4.5 | 1.6 | — | 1.4 | — | bal. | 0.3 | 0.36 | negative | 0.11 | 0.09 | negative |
| nizer | 2 | 30.2 | 4.3 | 1.5 | — | 1.5 | — | " | 2.5 | 0.23 | " | 0.09 | 0.08 | " |
| ring | 3 | 39.6 | 4.7 | 1.7 | 0.2 | 1.5 | — | " | 6.7 | 0.12 | " | 0.09 | 0.09 | " |
| of the | 4 | 35.5 | 2.1 | — | 1.3 | 1.7 | — | " | 0.2 | 0.34 | " | 0.10 | 0.08 | " |
| present | 5 | 24.0 | 7.9 | 1.6 | 0.5 | 1.6 | — | " | 9.8 | 0.09 | " | 0.08 | 0.08 | " |
| invention | 6 | 30.5 | 5.1 | 0.12 | — | 1.8 | — | " | 3.1 | 0.35 | " | 0.09 | 0.08 | " |
| | 7 | 30.0 | 5.2 | 2.9 | — | 1.4 | — | " | 6.5 | 0.06 | " | 0.09 | 0.09 | " |
| | 8 | 30.3 | 4.9 | — | 0.13 | 1.5 | — | " | 0.8 | 0.36 | " | 0.10 | 0.08 | " |
| | 9 | 29.6 | 4.3 | — | 2.3 | 1.4 | — | " | 2.6 | 0.12 | " | 0.09 | 0.09 | " |
| | 10 | 30.3 | 5.5 | 1.5 | 1.0 | 0.13 | — | " | 1.5 | 0.21 | " | 0.09 | 0.08 | " |
| | 11 | 31.5 | 4.7 | — | 1.2 | 2.9 | — | " | 2.3 | 0.11 | " | 0.08 | 0.08 | " |
| | 12 | 29.8 | 4.6 | 1.6 | — | 1.5 | 0.12 | " | 2.6 | 0.21 | " | 0.09 | 0.08 | " |
| | 13 | 28.9 | 4.6 | 1.3 | 1.0 | 1.5 | 2.5 | " | 1.9 | 0.05 | " | 0.09 | 0.09 | " |
| | 14 | 27.5 | 5.1 | 1.4 | — | 1.6 | 2.9 | " | 3.4 | 0.05 | " | 0.09 | 0.09 | " |
| Compara- | 1 | 17.5* | 4.3 | 1.7 | — | 1.5 | — | " | 0.6 | 0.83 | positive | 0.12 | 0.04 | deformed |
| tive | 2 | 42.1* | 3.8 | 1.6 | 0.3 | 1.6 | — | " | 8.5 | cracking | | — | — | cracked |

TABLE 1-continued

| Samples | | Composition (wt %) | | | | | | Cu + impurities | Average thickness of oxide film layer (μm) | Axial travel by wear (mm) | Adhesive wear | Friction coefficient | | Cracking or deformation |
|---|---|---|---|---|---|---|---|---|---|---|---|---|---|---|
| | | Zn | Al | Ti | Zr | Sn | Mn | | | | | Initial | Later | |
| synchronizer ring | | | | | | | | | | | occurred in 8200 cycles, unmeasurable | | | |
| | 3 | 35.0 | 1.6* | 1.5 | 1.0 | 1.7 | — | " | 1.0 | 0.76 | negative | 0.11 | 0.05 | deformed |
| | 4 | 28.5 | 8.9* | — | 2.7 | 1.6 | — | " | 9.1 | | cracking occurred in 6900 cycles | — | — | cracked |
| | 5 | 30.5 | 4.6 | —* | —* | 1.8 | — | " | 2.5 | 0.68 | negative | 0.09 | 0.04 | " |
| | 6 | 29.8 | 5.0 | 3.9* | — | 1.7 | — | " | 1.9 | cracked | occurred | — | — | " |
| | 7 | 30.3 | 4.8 | 2.0 | 0.6 | —* | — | " | 3.0 | 0.74 | negative | 0.10 | 0.05 | " |
| | 8 | 29.8 | 5.1 | 1.9 | 0.5 | 4.1* | — | " | 2.7 | | cracking occurred in 8900 cycles | — | — | " |
| | 9 | 30.3 | 4.7 | 1.6 | — | 1.7 | — | " | 0.05* | 0.43 | positive | 0.14 | 0.06 | negative |
| | 10 | 30.6 | 4.5 | 1.8 | 0.5 | 1.4 | — | " | 12.3* | 0.54 | negative | 0.03 | 0.06 | " |

EXAMPLE 2

Using an ordinary high-frequency induction furnace, melts of Cu base alloys having the compositions shown in Table 2 were prepared and subsequently worked into round bars under the same conditions as in Example 1. The round bars were cut to sections of a predetermined length, hot forged at 600°–750° C., subjected to cutting and grinding operations. Thereafter, the sections were shot-blasted in the atmosphere with a 1:1 (vol%) mixture of SiC beads (10–300 μm in diameter) and steel beads, so as to form work-hardened layers (for their average thicknesses, see Table 2) on the entire surface of the sections. By these procedures, sample Nos. 15–35 of the synchronizer ring of the present invention and comparative sample Nos. 11–18 were fabricated; each ring sample had an inside diameter of 58 mm and a thickness of 4 mm, with 36 chamfers provided around the peripheral edge of the ring.

Comparative sample Nos. 11–18 were outside the scope of the present invention in terms of either the content of one or more constituent elements ore the average thickness of the work-hardened layer (as marked with asterisks in Table 2).

The respective samples of synchronizer ring were subjected to a synchronizing endurable test under the following conditions:
Rotational speed of tapered cone: 1,200 rpm
Axial force exerted on the tapered cone: 55 kg
Oil: mission oil No. 80
Oil temperature: 75° C.
Tapered cone movement: 20,000 cycles at synchronization intervals of 0.2–0.3 sec The parameters that were measured or examined in this test were: axial travel from the normal synchronizing position (indicative of wear); occurrence of adhesive wear; and friction coefficients in the initial stage (up to 500 cycles) and in the later stage (stable period).

In order to check for the occurrence of cracking or deformation in the range, the samples were also subjected to the second kind of synchronizing endurance test under the same conditions as those employed in Example 1.

The test results are shown in Table 2.

TABLE 2

| Samples | | Composition (wt %) | | | | | | | | | Cu + impurities | Average thickness of work-hardened layer (μm) | Axial travel by wear (mm) | adhesive wear | Friction coefficient | | Cracking or deformation |
|---|---|---|---|---|---|---|---|---|---|---|---|---|---|---|---|---|---|
| | | Zn | Al | Ti | Zr | Fe | Ni | Co | Mn | Sn | | | | | initial | later | |
| Synchronizer ring of the present invention | 15 | 20.2 | 4.6 | 1.6 | — | — | — | 2.6 | — | — | bal. | 45 | 0.36 | negative | 0.11 | 0.09 | negative |
| | 16 | 30.4 | 4.3 | 1.7 | — | — | 1.9 | — | — | — | " | 80 | 0.22 | " | 0.10 | 0.08 | " |
| | 17 | 39.8 | 4.2 | — | 1.5 | 2.1 | — | 0.6 | — | — | " | 175 | 0.09 | " | 0.10 | 0.09 | " |
| | 18 | 30.3 | 2.1 | — | 1.6 | 0.8 | 0.1 | 0.3 | — | — | " | 60 | 0.38 | " | 0.11 | 0.08 | " |
| | 19 | 26.5 | 7.8 | 1.0 | 1.0 | 0.9 | 0.8 | — | — | — | " | 140 | 0.10 | " | 0.09 | 0.08 | " |
| | 20 | 30.5 | 4.3 | 0.13 | — | — | — | 0.13 | — | — | " | 75 | 0.36 | " | 0.08 | 0.08 | " |
| | 21 | 29.7 | 4.5 | — | 2.9 | 0.16 | — | 0.9 | — | — | " | 285 | 0.06 | " | 0.09 | 0.09 | " |
| | 22 | 31.5 | 3.9 | 1.5 | — | 3.8 | — | — | — | — | " | 105 | 0.10 | " | 0.11 | 0.09 | " |
| | 23 | 29.6 | 4.0 | 0.5 | 1.1 | — | 0.6 | 0.3 | — | — | " | 100 | 0.16 | " | 0.10 | 0.09 | " |
| | 24 | 30.3 | 4.1 | — | 1.3 | — | 1.5 | 1.0 | — | — | " | 105 | 0.20 | " | 0.08 | 0.07 | " |
| | 25 | 32.5 | 3.7 | 1.4 | 0.5 | 2.2 | — | 0.5 | — | — | " | 140 | 0.13 | " | 0.09 | 0.08 | " |
| | 26 | 28.5 | 5.2 | 1.0 | 1.3 | 1.1 | 1.1 | 0.9 | — | — | " | 155 | 0.10 | " | 0.11 | 0.09 | " |
| | 27 | 29.0 | 5.1 | 1.7 | — | — | 1.8 | 0.1 | 0.11 | — | " | 135 | 0.23 | " | 0.10 | 0.08 | " |
| | 28 | 30.3 | 5.2 | 1.5 | 0.3 | 1.0 | 1.5 | — | 2.8 | — | " | 130 | 0.14 | " | 0.09 | 0.08 | " |
| | 29 | 29.5 | 4.6 | — | 0.9 | — | 2.0 | 1.0 | 4.9 | — | " | 100 | 0.07 | " | 0.10 | 0.09 | " |
| | 30 | 29.7 | 4.5 | — | 1.2 | 0.1 | 1.4 | 0.2 | — | 0.12 | " | 90 | 0.24 | " | 0.09 | 0.07 | " |
| | 31 | 30.3 | 4.1 | 1.6 | — | 1.4 | — | 0.3 | — | 1.6 | " | 95 | 0.14 | " | 0.10 | 0.09 | " |
| | 32 | 28.5 | 5.2 | 1.5 | 0.6 | 1.1 | 1.5 | — | — | 2.9 | " | 105 | 0.09 | " | 0.10 | 0.10 | " |
| | 33 | 30.1 | 4.8 | 0.1 | 0.1 | — | — | 3.4 | 0.12 | 0.19 | " | 70 | 0.29 | " | 0.10 | 0.08 | " |

TABLE 2-continued

| Samples | | Zn | Al | Ti | Zr | Fe | Ni | Co | Mn | Sn | Cu + impurities | Average thickness of work-hardened layer (μm) | Axial travel by wear (mm) | adhesive wear | Friction coefficient initial | Friction coefficient later | Cracking or deformation |
|---|---|---|---|---|---|---|---|---|---|---|---|---|---|---|---|---|---|
| | 34 | 29.5 | 4.6 | 2.6 | — | — | 1.3 | 2.1 | 4.2 | 2.1 | " | 140 | 0.06 | " | 0.10 | 0.09 | " |
| | 35 | 28.5 | 5.0 | 0.6 | 0.8 | 0.6 | 0.8 | 0.5 | 2.1 | 1.0 | " | 5 | 0.11 | " | 0.10 | 0.09 | " |
| Comparative synchronizer ring | 11 | 18.1* | 4.6 | 1.5 | — | 1.1 | 1.1 | 0.5 | — | — | " | 40 | 0.85 | negative | 0.12 | 0.05 | deformed |
| | 12 | 42.3* | 4.3 | 1.6 | 0.9 | 0.5 | 2.0 | — | — | — | " | 190 | cracking occurred in 9000 cycles | | — | — | cracked |
| | 13 | 30.3 | 1.6* | — | 1.5 | 1.6 | — | — | — | — | " | 85 | 0.77 | negative | 0.11 | 0.05 | deformed |
| | 14 | 29.8 | 9.1* | — | 2.0 | 1.1 | 1.1 | 1.2 | — | — | " | 250 | cracking occurred in 6700 cycles | | — | — | cracked |
| | 15 | 30.5 | 4.5 | —* | —* | 2.5 | — | — | — | — | " | 145 | 0.72 | negative | 0.11 | 0.05 | " |
| | 16 | 30.3 | 5.0 | 1.7 | — | —* | —* | —* | — | — | " | 160 | 0.74 | " | 0.11 | 0.06 | " |
| | 17 | 29.7 | 4.9 | 1.6 | — | 1.3 | — | 0.6 | — | — | " | 2* | 0.44 | positive | 0.14 | 0.06 | negative |
| | 18 | 30.3 | 4.5 | — | 1.9 | 2.1 | 1.0 | 0.5 | — | — | " | 321* | 0.66 | negative | 0.05 | 0.06 | " |

EXAMPLE 3

Using an ordinary high-frequency induction furnace, melts of Cu base alloys having the compositions shown in Table 3 were prepared. The melts were processed as in Example 1 to fabricate sample Nos. 36–57 of the synchronizer ring of the present invention and comparative sample Nos. 19–25. The ring samples had oxide film layers formed in the average thicknesses noted in Table 3.

Comparative sample Nos. 19–25 were outside the scope of the present invention in terms of either the content of one or more constituent elements or the average thickness of the oxide film layer (as marked with asterisks in Table 3).

The respective samples of synchronizer ring were subjected to a synchronizing endurance test under the same conditions as in Example 1 except that the axial force exerted on the tapered cone was increased to 55 kg.

The parameters that were measured or examined in this test were: axial travel from the normal synchronizing position (indicative or wear); occurrence of adhesive wear; and friction coefficients in the initial stage (up to 500 cycles) and in the later stage (stable period).

In order to check for the occurrence of cracking or deformation in the range, the samples were also subjected to the second kind of synchronizing endurance test under the same conditions as those employed in Example 1.

TABLE 3

| Samples | | Zn | Al | Si | Mn | Sn | Ti | Zr | Cr | Cu + impurities | Average thickness of oxide film layer (μm) | Axial travel by wear (mm) | Adhesive wear | Friction coefficient Initial | Friction coefficient later | Cracking or deformation |
|---|---|---|---|---|---|---|---|---|---|---|---|---|---|---|---|---|
| Synchronizer ring of the present invention | 36 | 20.5 | 4.8 | 1.2 | 2.6 | — | — | — | — | bal. | 0.5 | 0.34 | negative | 0.12 | 0.09 | negative |
| | 37 | 29.6 | 4.7 | 1.3 | 2.5 | — | — | — | — | " | 1.6 | 0.22 | " | 0.09 | 0.08 | " |
| | 38 | 39.6 | 4.2 | 1.0 | 2.5 | — | — | — | — | " | 3.6 | 0.09 | " | 0.10 | 0.09 | " |
| | 39 | 34.6 | 2.1 | 1.2 | 2.3 | — | — | — | — | " | 0.3 | 0.36 | " | 0.12 | 0.09 | " |
| | 40 | 26.4 | 7.8 | 1.1 | 2.1 | — | — | — | — | " | 8.6 | 0.10 | " | 0.09 | 0.09 | " |
| | 41 | 30.5 | 5.0 | 0.22 | 2.5 | — | — | — | — | " | 2.5 | 0.34 | " | 0.10 | 0.08 | " |
| | 42 | 29.8 | 5.1 | 1.9 | 2.3 | — | — | — | — | " | 1.9 | 0.11 | " | 0.09 | 0.09 | " |
| | 43 | 30.3 | 4.8 | 1.3 | 0.11 | — | — | — | — | " | 2.5 | 0.31 | " | 0.09 | 0.08 | " |
| | 44 | 32.5 | 4.6 | 1.2 | 4.9 | — | — | — | — | " | 3.3 | 0.10 | " | 0.10 | 0.09 | " |
| | 45 | 31.3 | 4.5 | 1.3 | 1.5 | 0.13 | — | — | — | " | 5.6 | 0.19 | " | 0.09 | 0.09 | " |
| | 46 | 28.9 | 5.4 | 1.4 | 2.1 | 1.4 | — | — | — | " | 9.7 | 0.16 | " | 0.08 | 0.08 | " |
| | 47 | 27.5 | 6.1 | 1.5 | 2.0 | 2.8 | — | — | — | " | 4.8 | 0.09 | " | 0.09 | 0.09 | negative |
| | 48 | 30.4 | 4.8 | 1.1 | 1.0 | — | 0.053 | — | — | " | 3.6 | 0.20 | " | 0.09 | 0.08 | " |
| | 49 | 31.5 | 5.0 | 1.0 | 1.7 | — | 0.94 | — | — | " | 5.1 | 0.16 | " | 0.09 | 0.09 | " |
| | 50 | 30.6 | 4.7 | 1.1 | 2.1 | — | 1.48 | — | — | " | 4.3 | 0.06 | " | 0.09 | 0.09 | " |
| | 51 | 31.3 | 4.1 | 1.0 | 1.8 | — | — | 0.051 | — | " | 2.5 | 0.22 | " | 0.09 | 0.08 | " |
| | 52 | 29.6 | 5.0 | 0.9 | 2.1 | — | — | 0.64 | — | " | 3.1 | 0.15 | " | 0.09 | 0.09 | " |
| | 53 | 30.5 | 4.6 | 1.1 | 2.4 | — | — | — | 1.26 | " | 2.9 | 0.07 | " | 0.10 | 0.10 | " |
| | 54 | 31.0 | 4.3 | 1.1 | 2.5 | — | 0.43 | — | 0.33 | " | 2.7 | 0.12 | " | 0.09 | 0.09 | " |
| | 55 | 30.6 | 4.7 | 0.9 | 2.3 | 0.7 | — | — | 0.07 | " | 3.3 | 0.18 | " | 0.09 | 0.08 | " |
| | 56 | 29.8 | 4.6 | 0.8 | 1.5 | 1.9 | — | 0.99 | 0.74 | " | 4.1 | 0.11 | " | 0.10 | 0.09 | " |
| | 57 | 30.0 | 4.4 | 0.9 | 2.1 | 1.8 | 0.34 | 0.24 | 0.66 | " | 2.6 | 0.09 | " | 0.09 | 0.08 | " |
| Comparative synchronizer ring | 19 | 18.1* | 4.5 | 1.2 | 2.6 | — | — | — | — | bal. | 1.9 | 0.96 | positive | 0.12 | 0.04 | deformed |
| | 20 | 42.5* | 4.3 | 1.1 | 2.6 | — | — | — | — | " | 3.1 | cracking occurred in 8900 cycles | | — | — | cracked |
| | 21 | 30.5 | 1.4* | 1.3 | 2.4 | — | — | — | — | " | 2.6 | 0.83 | negative | 0.11 | 0.05 | deformed |
| | 22 | 28.5 | 9.2* | 1.1 | 2.3 | — | — | — | — | " | 2.9 | cracking occurred in | | — | — | cracked |

TABLE 3-continued

| Samples | Composition (wt %) | | | | | | | | Cu + impurities | Average thickness of oxide film layer (μm) | Axial travel by wear (mm) | Adhesive wear | Friction coefficient | | Cracking or deformation |
|---|---|---|---|---|---|---|---|---|---|---|---|---|---|---|---|
| | Zn | Al | Si | Mn | Sn | Ti | Zr | Cr | | | | | Initial | later | |
| | | | | | | | | | | | 6800 cycles | | | | |
| 23 | 29.5 | 4.5 | —* | —* | — | — | — | — | " | 3.0 | 0.84 | negative | 0.12 | 0.05 | " |
| 24 | 30.4 | 4.3 | 1.5 | 1.9 | — | — | — | — | " | 0.04* | 0.44 | positive | 0.15 | 0.06 | negative |
| 25 | 30.5 | 4.6 | 1.4 | 2.5 | — | — | — | — | " | 12.5* | 0.67 | negative | 0.05 | 0.05 | " |

EXAMPLE 4

Using an ordinary high-frequency induction furnace, melts of Cu base alloys having the compositions shown in Table 4 were prepared. The melts were processed as in Example 2 to fabricate sample No. 58–80 of the synchronizer ring of the present invention and comparative sample Nos. 26–33. The ring samples had work-hardened layers formed in the average thicknesses noted in Table 4.

Comparative sample Nos. 26–33 were outside the scope of the present invention in terms of either the content of one or more constituent elements or the average thickness of the work-hardened layer (as marked with asterisks in Table 4).

The respective samples of synchronizer ring were subjected to a synchronizing endurance test under the following conditions:
Rotational speed of tapered cone: 1,200 rpm
Axial force extered on the tapered cone: 57 kg
Oil: mission oil No. 80
Oil temperature: 80° C.
Tapered cone movement: 20,000 cycles at synchronization intervals of 0.3–0.35 sec.

The parameters that were measured or examined in this test were; axial travel from the normal synchronizing position (indicative of wear); occurrence of adhesive wear; and friction coefficients in the initial stage (up to 500 cycles) and in the later stage (stable period).

In order to check for the occurrence of cracking or deformation in the ring, the samples were also subjected to the second kind of synchronizing endurance test under the same conditions as those employed in Example 1.

The test results are shown in Table 5.

TABLE 4

| Samples | | Composition (wt %) | | | | | | | | | | | Average thickness of work-hardened layer (μm) |
|---|---|---|---|---|---|---|---|---|---|---|---|---|---|
| | | Zn | Al | Si | Fe | Ni | Co | Mn | Sn | Ti | Zr | Cr | Cu + impurities | |
| Synchro- | 58 | 20.8 | 4.6 | 1.2 | — | — | 3.2 | — | — | — | — | — | bal. | 35 |
| nizer | 59 | 39.6 | 3.8 | 1.1 | — | 2.4 | 1.0 | — | — | — | — | — | " | 100 |
| ring | 60 | 30.7 | 2.1 | 1.4 | 2.0 | 1.2 | — | — | — | — | — | — | " | 10 |
| of the | 61 | 27.5 | 7.9 | 1.0 | 1.4 | — | 2.3 | — | — | — | — | — | " | 255 |
| present | 62 | 29.5 | " | 0.21 | 1.0 | 0.6 | — | — | — | — | — | — | " | 85 |
| inven- | 63 | 29.7 | 4.9 | 1.9 | — | 0.19 | — | — | — | — | — | — | " | 110 |
| tion | 64 | 30.3 | 4.8 | 1.1 | — | — | 0.13 | — | — | — | — | — | " | 65 |
| | 65 | 29.6 | 5.0 | 1.0 | 0.8 | 0.7 | 0.7 | — | — | — | — | — | " | 135 |
| | 66 | 30.2 | 4.6 | 1.2 | 3.2 | 1.4 | — | — | — | — | — | — | " | 70 |
| | 67 | 29.8 | 4.7 | 1.1 | 4.3 | — | — | 0.12 | — | — | — | — | " | 290 |
| | 68 | 30.5 | 4.8 | 1.0 | 0.4 | 0.4 | 0.8 | 2.6 | — | — | — | — | " | 75 |
| | 69 | 30.3 | 5.0 | 0.9 | — | 4.2 | — | — | 0.11 | — | — | — | " | 60 |
| | 70 | 29.8 | 4.9 | 1.2 | 2.1 | — | 1.0 | — | 2.9 | — | — | — | " | 65 |
| | 71 | 30.9 | 5.0 | 1.1 | — | — | 3.3 | — | — | 0.8 | — | — | " | 70 |
| | 72 | 29.2 | 6.2 | 0.3 | 0.04 | 0.06 | 0.08 | — | — | 0.054 | 0.061 | 0.021 | " | 105 |
| | 73 | 26.7 | 5.6 | 0.9 | 0.9 | 0.6 | 0.8 | 2.2 | 1.4 | — | — | — | " | 100 |
| | 74 | 30.2 | 4.6 | 1.1 | 2.4 | 1.1 | — | 4.8 | 0.12 | — | — | — | " | 70 |
| | 75 | 35.2 | 6.4 | 1.6 | — | — | 5.4 | 0.14 | — | — | — | 1.24 | " | 65 |
| | 76 | 23.1 | 2.8 | 0.9 | — | 3.3 | — | 3.2 | — | — | 0.053 | — | " | 120 |
| | 77 | 24.5 | 3.2 | 0.6 | — | — | 0.13 | — | 2.1 | 0.054 | 0.09 | 0.02 | " | 105 |
| | 78 | 32.1 | 7.1 | 0.7 | 3.2 | 2.4 | — | — | 0.11 | 0.43 | 0.39 | 0.46 | " | 105 |
| | 79 | 30.8 | 5.1 | 1.2 | 0.6 | — | 0.9 | 0.9 | 0.6 | 0.72 | — | 0.34 | " | 100 |
| | 80 | 29.2 | 4.9 | 0.8 | 1.1 | 0.9 | 0.8 | 2.1 | 1.1 | 0.32 | 0.13 | 0.21 | " | 70 |
| Compara- | 26 | 18.2* | 4.3 | 1.0 | 2.5 | 1.0 | — | — | — | — | — | — | " | 105 |
| tive | 27 | 42.3* | 4.1 | 1.1 | — | 2.2 | — | — | — | — | — | — | " | 85 |
| synchro- | 28 | 30.4 | 1.6* | 1.5 | — | — | 2.3 | — | — | — | — | — | " | 90 |
| nizer | 29 | 29.6 | 9.2* | 1.1 | 1.1 | — | 1.2 | — | — | — | — | — | " | 145 |
| ring | 30 | 30.3 | 4.6 | —* | — | 1.9 | 1.5 | — | — | — | — | — | " | 120 |
| | 31 | 29.8 | 4.7 | 1.3 | —* | —* | —* | — | — | — | — | — | " | 130 |
| | 32 | 30.1 | 4.9 | 1.1 | — | — | 2.0 | — | — | — | — | — | " | 2* |
| | 33 | 29.8 | 5.1 | 1.2 | 1.0 | 2.5 | — | — | — | — | — | — | " | 320* |

TABLE 5

| Samples | | Axial travel by wear (μm) | Average wear | Friction coefficient | | Cracking or deformation |
|---|---|---|---|---|---|---|
| | | | | Initial | Later | |
| Synchro- | 58 | 0.36 | negative | 0.11 | 0.08 | negative |
| nizer | 59 | 0.13 | " | 0.10 | 0.09 | " |

TABLE 5-continued

| Samples | | Axial travel by wear (μm) | Average wear | Friction coefficient Initial | Friction coefficient Later | Cracking or deformation |
|---|---|---|---|---|---|---|
| ring | 60 | 0.38 | " | 0.12 | 0.09 | " |
| of the | 61 | 0.10 | " | 0.09 | 0.09 | " |
| present | 62 | 0.35 | " | 0.10 | 0.08 | " |
| inven- | 63 | 0.22 | " | 0.09 | 0.07 | " |
| tion | 64 | 0.34 | " | 0.10 | 0.08 | " |
| | 65 | 0.14 | " | 0.11 | 0.09 | " |
| | 66 | 0.22 | " | 0.10 | 0.09 | " |
| | 67 | 0.21 | " | 0.09 | 0.08 | " |
| | 68 | 0.09 | " | 0.10 | 0.09 | " |
| | 69 | 0.22 | " | 0.10 | 0.08 | " |
| | 70 | 0.10 | " | 0.10 | 0.09 | " |
| | 71 | 0.09 | " | 0.11 | 0.09 | " |
| | 72 | 0.21 | " | 0.09 | 0.08 | " |
| | 73 | 0.07 | " | 0.10 | 0.09 | " |
| | 74 | 0.10 | " | 0.11 | 0.09 | " |
| | 75 | 0.05 | " | 0.11 | 0.10 | " |
| | 76 | 0.10 | " | 0.10 | 0.09 | " |
| | 77 | 0.27 | " | 0.09 | 0.08 | " |
| | 78 | 0.05 | " | 0.11 | 0.10 | " |
| | 79 | 0.13 | " | 0.10 | 0.09 | " |
| | 80 | 0.14 | " | 0.10 | 0.09 | " |
| Compara- | 26 | 0.75 | positive | 0.13 | 0.05 | deformed |
| tive | 27 | cracking occurred in 8800 cycles | | — | — | cracked |
| synchro- | 28 | 0.80 | positive | 0.11 | 0.06 | deformed |
| nizer ring | 29 | cracking occurred in 6700 cycles | | — | — | cracked |
| | 30 | 0.75 | negative | 0.11 | 0.06 | " |
| | 31 | 0.77 | " | 0.11 | 0.05 | " |
| | 32 | 0.46 | positive | 0.14 | 0.07 | negative |
| | 33 | 0.39 | negative | 0.05 | 0.06 | " |

The data in Tables 1, 2, 3 and 5 show that synchronizer ring sample Nos. 1–80 fabricated in accordance with the present invention had high strength and toughness; in addition, in the initial period of application where very high pressures were exerted on the ring, they exhibited good compatibility with mating surfaces without causing any abnormal wear. Compared with this high wear resistance of sample Nos. 1–80, comparative sample Nos. 1–33 which were outside the scope of the present invention in terms of any one of the essential features of the present invention were inferior to the samples of the present invention with respect to one or more of the characteristics mentioned above.

Needless to say, the same results will be obtained with "pin" type synchronizer rings.

As discussed on the foregoing pages, the synchronizer ring of the present invention for use in a speed variator and which is made of the Cu base alloy specified herein has high strength and toughness and exhibits good accommodation by mating surfaces. Therefore, even under hostile conditions such as those created by speed variators producing larger output powders, the synchronizer ring of the present invention can perform satisfactorily without experiencing any abnormal kind of wear such as bright surface wear or adhesive wear and its high wear resistance is ensured for a prolonged period.

What is claimed is

1. A synchronizer ring made of a Cu base alloy for use in a speed variator that exhibits good initial accommodation by a mating surface and which has high wear resistance, said alloy consisting essentially of an a weight percent basis, 20–40% Zn, 2–8% Al, two components which are intermetallic compound forming components selected from the group consisting of (a) 0.1–3% of one or more elements selected from the group consisting of Ti, Zr and Cr, (b) 0.1–3% Sn, (c) 0.1–6% of one or more elements selected from the group consisting of Fe, Ni and Co, (d) 0.1–5% of Mn and (e) 0.2–2% Si, and optionally at least one additional component that differs from said two components and is selected from the group consisting of (i) 0–3% of one or more elements selected from the group consisting of Ti, Zr and Cr, (ii) 0–3% Sn and (iii) 0–5% Mn, and the balance being Cu and incidental impurities, said ring having either an oxide film layer of aluminum oxide base with an average thickness of 0.1–10 μm or a work-hardened layer with an average thickness of 5–300 μformed on at least the surface of the ring where it is to contact a mating member.

2. The synchronizer ring according to claim 1 wherein said intermetallic compound forming components are Sn and at least one of Ti, Zr and Cr.

3. The synchronizer ring according to claim 2 wherein Mn is present as said additional component.

4. The synchronizer ring according to claim 1 wherein said intermetallic compound forming components are at least one of Ti Zr and Cr and at least one of Fe, Ni and Co.

5. The synchronizer ring according to claim 4 wherein Sn and Mn are present as said additional components.

6. The synchronizer ring according to claim 1 wherein said intermetallic compound forming components are Si and Mn.

7. The synchronizer ring according to claim 6 wherein Sn and at least one of Ti, Zr and Cr are present as said additional components.

8. The synchronizer ring according to claim 1 wherein said intermetallic compound forming components are Si and at least one of Fe, Ni and Co.

9. The synchronizer ring according to claim 8 wherein Sn and at least one of Ti, Zr and Cr and at least one of Sn and Mn are present as said additional components.

10. The synchronizer ring according to claim 1 wherein Mn as said additional component is present in an amount of 0.1–5%.

11. The synchronizer ring according to claim 1 wherein Sn as said additional component is present in an amount of 0.1–3%.

12. The synchronizer ring according to claim 1 wherein at least one of Ti, Zr and Cr is present as said additional component in an amount of 0.1–3%.

13. The synchronizer ring according to any one of claims 1 to 12 having an oxide film layer of aluminum oxide base formed on at least the surface of the ring where it is to contact the mating member.

14. The synchronizer ring according to any one of claims 1 to 12 having a work-hardened layer formed on at least the surface of the ring where it is to contact the mating member.

15. The synchronizer ring according to claim 1, wherein the ring has an oxide film layer consisting essentially of $Al_2O_3$-$ZnO_2$.

16. The synchronizer ring according to claim 1, wherein the ring has an oxide film layer consisting essentially of $Al_2O_3$-$ZnO_2$-$CuO$.

17. The synchronizer ring according to claim 1, wherein the ring has an oxide film layer consisting essentially of $Al_2O_3$-$ZnO_2$ and $Al_2O_3$-$CuO$.

* * * * *